United States Patent
Tollefson

(10) Patent No.: US 9,333,716 B2
(45) Date of Patent: May 10, 2016

(54) METHOD FOR CAST MOLDING CONTACT LENSES

(75) Inventor: Norris M. Tollefson, Cumming, GA (US)

(73) Assignee: NOVARTIS AG (CH)

( * ) Notice: Subject to any disclaimer, the term of this patent is extended or adjusted under 35 U.S.C. 154(b) by 835 days.

(21) Appl. No.: 12/316,952

(22) Filed: Dec. 18, 2008

(65) Prior Publication Data

US 2009/0160073 A1  Jun. 25, 2009

Related U.S. Application Data

(60) Provisional application No. 61/008,417, filed on Dec. 20, 2007.

(51) Int. Cl.
| B29D 11/00 | (2006.01) |
| B29C 45/00 | (2006.01) |
| B29K 23/00 | (2006.01) |

(52) U.S. Cl.
CPC ...... *B29D 11/00038* (2013.01); *B29C 45/0001* (2013.01); *B29K 2023/12* (2013.01)

(58) Field of Classification Search
CPC .............. B29C 45/0001; B29D 11/00038; B29K 2023/12
USPC ........................................................ 264/2.5
See application file for complete search history.

(56) References Cited

U.S. PATENT DOCUMENTS

| 3,940,379 | A | | 2/1976 | Castagna | |
| 4,296,022 | A | | 10/1981 | Hudson | |
| 4,451,589 | A | | 5/1984 | Morman | |
| 4,514,534 | A | | 4/1985 | DiNardo | |
| 4,689,082 | A | | 8/1987 | Dexheimer | |
| 4,707,524 | A | | 11/1987 | Ehrig | |
| 5,036,971 | A | * | 8/1991 | Seden et al. | 206/5.1 |
| 5,368,919 | A | | 11/1994 | Robeson | |
| 5,456,864 | A | | 10/1995 | Wickes | |
| 5,530,073 | A | | 6/1996 | Schoenberg | |
| 5,597,881 | A | | 1/1997 | Winter | |
| 5,639,818 | A | | 6/1997 | Lee | |
| 5,674,557 | A | * | 10/1997 | Widman et al. | 427/133 |
| 5,747,160 | A | | 5/1998 | Pinoca | |
| 5,843,346 | A | | 12/1998 | Morrill | |
| 6,153,715 | A | | 11/2000 | Nakamura | |
| 6,228,951 | B1 | | 5/2001 | Hirota | |
| 6,387,317 | B1 | | 5/2002 | Roberts | |
| 6,582,631 | B1 | | 6/2003 | Shepard | |
| 6,596,814 | B2 | | 7/2003 | Kim | |
| 6,599,985 | B2 | | 7/2003 | Fujii | |
| 6,827,325 | B2 | | 12/2004 | Hofmann | |
| 6,951,904 | B1 | | 10/2005 | Peeters | |
| 2002/0065371 | A1 | | 5/2002 | Fujii | |
| 2004/0044106 | A1 | | 3/2004 | Portnoy | |
| 2004/0127628 | A1 | * | 7/2004 | Walton et al. | 524/451 |
| 2004/0167270 | A1 | | 8/2004 | Chang | |
| 2006/0051454 | A1 | * | 3/2006 | Ansell et al. | 425/808 |
| 2006/0082013 | A1 | | 4/2006 | Bayer | |
| 2006/0173132 | A1 | * | 8/2006 | Mehta et al. | 525/191 |
| 2006/0240138 | A1 | * | 10/2006 | Broad et al. | 425/412 |
| 2006/0270766 | A1 | * | 11/2006 | Xu et al. | 524/109 |
| 2007/0077375 | A1 | * | 4/2007 | Honda et al. | 428/31 |

FOREIGN PATENT DOCUMENTS

| EP | 0765721 A2 | 4/1997 |
| EP | 0985686 A2 | 3/2000 |
| EP | 1629960 A2 | 3/2006 |

OTHER PUBLICATIONS

Hamed Azizi and Ismaiel Ghasemi; A Study of Rheological Properties of Peroxide-Degraded Polypropylene; Nov. 2004; Iran Polymer & Petrochemical Institute; pp. 4153-4155.*
PCT International Search Report dated Apr. 6, 2009 for International Application No. PCT/US2008/087309, International Filing Date Dec. 18, 2008.
PCT Written Opinon of the International Searching Authority dated Apr. 6, 2009, for International Application No. PCT/US2008/087309, International Filing Date Dec. 18, 2008.
Singapore Search Report and Written Opinion, Dated Jun. 16, 2014, Singapore Application No. 201209298-7.

* cited by examiner

*Primary Examiner* — Yogendra Gupta
*Assistant Examiner* — Ninh Le
(74) *Attorney, Agent, or Firm* — Sheng-Hsin Hu

(57) ABSTRACT

An improved method of cast molding contact lenses, wherein a lens forming mixture is cured in the lens-shaped cavity formed between molding surfaces of a male and female mold sections, wherein the improvement comprises at least one of sections is injection molded from a controlled rheology polypropylene.

8 Claims, No Drawings

METHOD FOR CAST MOLDING CONTACT LENSES

This application claims the benefit under 35 U.S.C. §119 (e) of U.S. provisional application Ser. No. 61/008,417 filed Dec. 20, 2007, herein incorporated by reference in its entirety.

The present invention relates to improvements in cast molding of contact lenses. In particular, the present invention is related to an improved method of cast molding contact lenses comprises injection molding at least one of sections from a controlled rheology polypropylene.

BACKGROUND OF THE INVENTION

Contact lenses, which are to be manufactured economically in large unit numbers, are preferably manufactured by the so-called mold or full-mold process. Lens molds for making contact lenses are well known to a person skilled in the art and, for example, are employed in cast molding or spin casting. For example, a mold (for full cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with a fluid polymerizable composition.

Most common mold material used for casting molding contact lenses is either a polypropylene or polystyrene. However, various problems have been associated with injection molding of such materials. For example, many grades of polypropylene exhibit poor processibility; while others, although having excellent processibility, result in an unsatisfactory mold due to surface distortions and the like. Several patents or patent application publications described methods to identify or improve polypropylene properties to improve mold quality. U.S. Pat. No. 5,843,346 discloses that improvements in the static cast molding of contact lenses. The improvement comprises injection molding at least one of the mold sections from a thermoplastic polyolefin resin having a melt flow rate of at least about 21 g/10 minutes. US 2006/0051454 A1 also discloses the improvements in the static cast molding of contact lenses. The improvement comprises injection molding at least one of the mold sections from a Ziegler-Natta catalyst based polyolefin having a melt flow rate of less than 21 g/10 min. U.S. Pat. No. 6,582,631 discloses at least one of the male and female mold sections is injection molded from a metallocene-catalyzed thermoplastic polyolefin resin.

However, there still exists a need in the art for an improved method of cast molding contact lenses with molds formed from polypropylene with improved rheology properties and at the meantime provide consistently superior qualities in the molded lenses.

SUMMARY OF THE INVENTION

The present invention provides an improved method of cast molding contact lenses, wherein a lens forming material is cured in the lens-shaped cavity formed between molding surfaces of a male and female mold sections, wherein the improvement comprises injection molding at least one of mold sections from a controlled rheology polypropylene, wherein the controlled rheology polypropylene has an increased melt flow rate of at least about 10 g/10 minutes, wherein the controlled rheology polypropylene has a melt flow rate of from 12 g/10 minutes to 80 g/10 minutes.

DETAILED DESCRIPTION OF THE INVENTION

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art. As employed throughout the disclosure, the following terms, unless otherwise indicated, shall be understood to have the following meanings.

The term "contact lens" employed herein in a broad sense and is intended to encompass any hard or soft lens used on the eye or ocular vicinity for vision correction, diagnosis, sample collection, drug delivery, wound healing, cosmetic appearance (e.g., eye color modification), or other ophthalmic applications.

A "hydrogel material" refers to a polymeric material which can absorb at least 10 percent by weight of water when it is fully hydrated. Generally, a hydrogel material is obtained by polymerization or copolymerization of at least one hydrophilic monomer in the presence of or in the absence of additional monomers and/or macromers. Exemplary hydrogels include, but are not limited to, poly (vinyl alcohol) (PVA), modified polyvinylalcohol (e.g., as nelfilcon A), poly (hydroxyethyl methacrylate), poly (vinyl pyrrolidone), PVAs with polycarboxylic acids (e.g., carbopol), polyethylene glycol, polyacrylamide, polymethacrylamide, silicone-containing hydrogels, polyurethanes, polyureas, and the like. A hydrogel can be prepared according to any methods known to a person skilled in the art.

A "HEMA-based hydrogel" refers to a hydrogel obtained by copolymerization of a polymerizable composition comprising hydroxyethylmethacrylate (HEMA).

A "silicone hydrogel" refers to a hydrogel obtained by copolymerization of a polymerizable composition comprising at least one silicone-containing monomer, at least one silicone-containing macromer, or at least one silicone-containing pre-polymer.

A "lens-forming material" refers to a material which can be polymerized and/or crosslinked actinically or thermally to form a contact lens.

A "mold" refers to a rigid object that may be used to form lenses from uncured formulations. The preferred molds are two part molds as described above, where either the front curve or the back curve of the mold is made of the controlled rheology polypropylene. Examples of polypropylene include but are not limited to Ziegler-Natta catalyst based polyolefin, metallocene catalyzed polypropylene that is nucleated and clarified, such as but not limited to Achieve 1615 from Exxon and ATOFINA EOD 00-11. The preferred method of making the molds of the invention is by injection molding using known techniques, but the molds could be made by other techniques lathing, diamond turning, or laser cutting.

The terms "propylene polymers" and "polypropylene" are used interchangeably, and generally refer to propylene homopolymers which include both Ziegler-Natta catalyzed based polypropylene and metallocene catalyzed polypropylene as well as all of the geometrical configurations of the material. These configurations include, but are not limited to, isotactic, syndiotactic, and atactic symmetries.

The term "controlled rheology polypropylene" refers to a polypropylene produced from a pristine polypropylene through the controlled rheology process and has properties different than the pristine polypropylene. Any known or suitable that controlled rheology processes can be used, for example, as disclosed in U.S. Pat. Nos. 3,940,379; 4,451,589; 5,530,073 and 6,599,985.

As an illustrative example, the controlled rheology process (or called peroxide chemical modification process) can be carried out as follow. A polypropylene resin, inorganic or organic peroxide can be charged to a blending zone. A blanket of an inert gas such as nitrogen, argon and the like is maintained within the blending zone by feeding the inert gas to said zone. The peroxide is uniformly blended with the polypropylene resin by means of an agitator, paddle, blade or the like within the blending zone. Although it is not considered strictly necessary to maintain the blending zone under an inert blanket, use of an inert gas is considered preferable for safety reasons. If desired, the blending of the polypropylene and peroxide can be effected upon admixture of the components during the extrusion operation.

Any inorganic or organic peroxide can be employed in the process of the present invention. Illustrative of the peroxides which can be suitably employed are hydrogen peroxide, dicumyl peroxide, t-butyl peroxy isopropyl carbonate, di-tertbutyl peroxide, p-chlorobenzoyl peroxide, dibenzoyl diperoxide, t-butyl cumyl peroxide, t-butyl hydroxyethyl peroxide, di-t-amyl peroxide, 2,5-dimethylhexene-2,5-di-perisononanoate and the like. The peroxide can be blended with the propylene resin in amounts varying from about 0.005 to 0.1 percent by weight of propylene resin.

The resulting peroxide/polypropylene blend can then be charged to the hopper of a high shear zone such as provided by an extruder. A condition of high shear is maintained within the extruder by heating the resin blend to a molten state with heating means associated with the extruder and working the melt in the annular zone between the extruder screw and the inner wall of the barrel of the extruder, as the melt passes through the extruder to the forming means or die which terminates the extruder. Thermal mechanical action of the extruder takes place at a temperature within the range of from about 150.degree. C. to about 300.degree. C.

The controlled rheology polypropylene exhibit narrower molecular weight distribution, higher melt flow rate, lower viscosity, less elastic character than the pristine polypropylene.

As used herein, the term "melt flow rate" (MFR) is a measure of the ease of flow of the melt of a thermoplastic polymer. It is defined as the weight of polymer in grams flowing in 10 minutes through a capillary of specific diameter and length by a pressure applied via prescribed alternative gravimetric weights for alternative prescribed temperatures. The method is given in ASTM D1238. The melt flow rate is an indirect measure of molecular weight, high melt flow rate corresponding to low molecular weight. At the same time, the melt flow rate is a measure of the ability of the molton material to flow under pressure.

The terms "pristine polypropylene" refers to the starting polypropylene prior to going through the controlled rheology process.

The terms "an increased melt flow rate" refers to difference in melt flow rate between the controlled rheology polypropylene and the corresponding pristine polypropylene.

As used herein, the term "tangent delta" means a dimensionless parameter, tangent delta (tan DELTA or loss tangent) is calculated from storage modulus (G) and loss modulus (G') measured from dynamic rheology tests. Tangent delta is a measure of the ratio of energy loss to energy stored in a cyclic deformation (G'/G') (i.e. tangent delta=(G')/(G)) which includes both the elastic and viscous contributions. The dynamic rheology test is given in ASTM D 4440. Frequency sweep was performed at 200° C. with a cone-and-plate rheometer. It is preferred that tangent delta be measured at as low a frequency as possible to enhance resolution between materials. In the present invention, tangent delta at 1.0 rad/second was used for comparison to warpage values.

As used herein, the term "mold warpage or cylinder" means the distortion of the mold. The radius of curvature of the FC (Front Curve) lens mold and the BC (Base Curve) lens mold together define the corrective power of the contact lens. Warpage of the mold as an individual piece is determined by measuring the radius of curvature in the direction aligned with the gate (the source of polypropylene for an injection molded lens mold) and the radius of curvature perpendicular to the gate. The convention says that radius of curvature at 90° orientation to gate minus radius of curvature at 0° orientation define warpage (or cylinder). With the gate at 12 o'clock, the radius of curvature aligned with the gate is measured between 12 and 6 o'clock, perpendicular to the gate is between 3 and 9 o'clock. Two common techniques involve interferometry and optical/visual inspection. Using laser reflectance, optical inspection is more conducive to automated measurements. Laser reflectance for automated visual inspection was used to measure radius of curvature in polypropylene lens molds, specifically a Nikon VMR-3020.

The invention is partly based on the discovery that, when a controlled rheology polypropylene is used as a mold material, the mold warpage could be reduced, comparing to the corresponding pristine polypropylene. It is found that the controlled rheology polypropylene having an increased melt flow rate that is at least about 10 g/10 minutes, wherein the controlled rheology polypropylene has a melt flow rate of from 12 g/10 minutes to 80 g/10 minutes.

The invention is further partly based on the discovery that, within limits setting at the immediate above paragraph, the controlled rheology polypropylene having a higher tangent delta could result in a smaller mold warpage, comparing at the same melt flow rate of the controlled rheology polypropylenes.

Although the inventors do not wish to be bound by any particular theory, it is believed that modification of the molecular structure of polypropylene after polymerization by the chemical action of peroxide-generated radicals in controlled rheology process narrows molecular weight distribution, increases melt flow rate, lower viscosity, and decreases elastic character. As a result, the controlled rheology polypropylene is easier to process, less shear sensitivity and results in less mold warpage than the corresponding pristine polypropylene. It is also believed that comparing at the same melt flow rate, the controlled rheology polypropylene having a higher tangent delta is easier to process, less shear sensitivity and results in less mold warpage.

The present invention provides an improved method of cast molding contact lenses, wherein a lens forming material is cured in the lens-shaped cavity formed between molding surfaces of a male and female mold sections, wherein the improvement comprises injection molding at least one of mold sections from a controlled theology polypropylene, wherein the controlled rheology polypropylene has an increased melt flow rate of at least about 10 g/10 minutes, wherein the controlled theology treated polypropylene has a melt flow rate of from 12 g/10 minutes to 80 g/10 minutes.

A solution of a lens-forming material can be prepared by dissolving the lens-forming material in any suitable solvent known to a person skilled in the art. Examples of suitable solvents are water, alcohols, such as lower alkanols (e.g., ethanol, methanol or isopropanol), carboxylic acid amides (e.g., dimethylformamide), dipolar aprotic solvents, such as dimethyl sulfoxide or methyl ethyl ketone, ketones (e.g., acetone or cyclohexanone), hydrocarbons (e.g., toluene, ethers, THF, dimethoxyethane or dioxane), and halogenated hydrocarbons (e.g., trichloroethane), and mixtures of suitable solvents (e.g., mixtures of water with an alcohol, a water/ethanol or a water/methanol mixture).

A preferred group of lens-forming materials are prepolymers which are water-soluble and/or meltable. It would be advantageous that a lens-forming material comprises primarily one or more prepolymers which are preferably in a substantially pure form (e.g., purified by ultrafiltration). Therefore, after crosslinking/polymerizing by actinic radiation, a contact lens may require practically no more subsequent purification, such as complicated extraction of unpolymerized constituents. Furthermore, crosslinking/polymerizing may take place solvent-free or in aqueous solution, so that a subsequent solvent exchange or the hydration step is not necessary.

In accordance with the present invention, a pristine polypropylene resin have an starting melt flow rate preferably from 0.1 g/10 minutes to 20 g/10 minutes, more preferably from 1 g/10 minutes to 10 g/10 minutes, further more preferably from 3 g/10 minutes to 12 g/10 minutes. The controlled rheology polypropylene has an increased melt flow rate of at least about 6 g/10 minutes, more preferably at least 10 g/10 minutes, and further more preferably at least 18 g/10 minutes, and the controlled rheology polypropylene has a melt flow rate of from 12 g/10 minutes to 80 g/10 minutes.

In accordance with the present invention, comparing at the same melt flow rate, the controlled rheology polypropylene have a lower tangent delta (loss tangent) is more efficient in reducing mold warpage. In one embodiment, the controlled rheology polypropylene has a tangent delta (at 1.0 rad/second) that is preferably at least 5, more preferably at least 10, and further more preferably at least 13.

In accordance with the present invention, in one embodiment, mold made from the controlled rheology polypropylene contains an appropriate nucleating agent is more efficient in reducing mold warpage as compared to the same controlled rheology polypropylene in the absence of such nucleating agent.

There are many types of nucleating agents for polypropylene, which would are suitable for inclusion in the controlled rheology polypropylene formulations of this invention. Suitable nucleating agents are disclosed by, for example, H. N. Beck in Heterogeneous Nucleating Agents for Polypropylene Crystallization, 11 J. APPLIED POLY. SCI. 673-685 (1967) and in Heterogeneous Nucleation Studies on Polypropylene, 21 J. POLY. SCI.: POLY. LETTERS 347-351 (1983). Exemplary nucleating agent include, but are not limited to, microtalc, sorbitor derivatives, phosphate salts, sodium benzoate, sodium 2,2'-methylenebis(4,6-di-tert-butylphenyl)phosphate, aluminum 2,2'-methylenebis(4,6-di-tert-butylphenyl) phosphate, dibenzylidene sorbitol, di(p-tolylidene)sorbitol, di(p-ethylbenzylidene)sorbitol, bis(3,4-dimethylbenzylidene)sorbitol, and N',N'-dicyclohexyl-2,6-naphthalenedicarboxamide, and salts of disproportionated rosin esters. Preferably, the nucleating concentration ranges from 500 to 3000 part per million by weight of polypropylene resin.

The previous disclosure will enable one having ordinary skill in the art to practice the invention. In order to better enable the reader to understand specific embodiments and the advantages thereof, reference to the following examples is suggested.

EXAMPLE 1

Reactor-prepared polypropylene flake with a MFR of 2 dg/min is combined with additives in proportions shown below.

| | |
|---|---|
| Irganox 3114 antioxidant | 1000 ppm |
| Irgafos 168 phosphate thermal stabilizer | 1000 pm |
| DHT4A hydrotalcite | 400 ppm |
| Millad 3988 nucleator | 1900 ppm |
| Glycerol Monostearate (GMS) | 500 ppm |
| Lupersol 101 peroxide | 360 ppm |

Additives are melt blended and peroxide chemical modification initiated by extrusion at 230-245° C. The resulting polypropylene formulation is characterized by dynamic rheology at 200° C. (ASTM D 4440) and by flexural modulus (ASTM D790, ISO 178).

EXAMPLE 2

Reactor-prepared polypropylene flake with a MFR of 11 dg/min is combined with additives in proportions shown below.

| | |
|---|---|
| Irganox 3114 antioxidant | 1000 ppm |
| Irgafos 168 phosphate thermal stabilizer | 1000 pm |
| DHT4A hydrotalcite | 400 ppm |
| HPN-68 nucleator | 500 ppm |
| Glycerol Monostearate (GMS) | 500 ppm |
| Lupersol 101 peroxide | 85 ppm |

Additives are melt blended and peroxide chemical modification initiated by extrusion at 230-245° C. The resulting polypropylene formulation is characterized by dynamic rheology at 200° C. (ASTM D 4440) and by flexural modulus (ASTM D790, ISO 178).

TABLE 1

| | Example 1 | Example 2 | Pristine Polypropylene |
|---|---|---|---|
| Flexural Modulus (MPa) | 1450 | 1500 | 1590 |
| MFR (dg/min) before peroxide chemical modification | 2 | 11 | 20 |
| MFR (dg/min) after | 20 | 20 | |

TABLE 1-continued

|  | Example 1 | Example 2 | Pristine Polypropylene |
|---|---|---|---|
| peroxide chemical modification |  |  |  |
| Tan DELTA at 1 rad/sec | 10.38 | 5.13 | 4.16 |
| Tan DELTA at 10 rad/sec | 2.82 | 2.04 | 1.82 |
| Warpage of concave (female) lens mold (mm) | −0.019 | −0.018 | 0.045 |

What is claim is:

1. An improved method of cast molding contact lenses, wherein a lens forming material is cured in a lens-shaped cavity formed between molding surfaces of a male and female mold sections, wherein the improvement comprises injection molding at least one of mold sections from a controlled rheology polypropylene, wherein the controlled rheology polypropylene has a higher melt flow rate of at least about 6 g/10 minutes than that of a corresponding pristine polypropylene, wherein the corresponding pristine polypropylene is a starting polypropylene prior to going through a controlled rheology process, wherein the controlled rheology polypropylene has a melt flow rate of from 12 g/10 minutes to 80 g/10 minutes, wherein the controlled rheology polypropylene having a tangent delta of at least about 5 at 1 rad/second provides the mold section with a less mold warpage, compared to a mold material having the corresponding pristine polypropylene having the same melt flow rate.

2. The improved method of claim 1, wherein the controlled rheology polypropylene has an increased melt flow rate of at least about 10 g/10 minutes.

3. The improved method of claim 1, wherein the controlled rheology polypropylene has an increased melt flow rate of at least about 18 g/10 minutes.

4. The improved method of claim 1, wherein the controlled rheology polypropylene having a melt flow rate from 20 g/10 minutes to 50 g/10 minutes.

5. The improved method of claim 3, wherein the controlled rheology polypropylene having a tangent delta that is at least about 10 at 1 rad/second.

6. The improved method of claim 1, wherein a nucleating agent is contacted with the controlled rheology polypropylene.

7. The improved method of claim 6, wherein the nucleating agent is a sorbitol derivative.

8. The improved method of claim 1, wherein the controlled rheology polypropylene is a controlled rheology metallocene catalyzed polypropylene.

* * * * *